United States Patent
Tsujisawa

(10) Patent No.: US 7,133,920 B2
(45) Date of Patent: Nov. 7, 2006

(54) MOBILE COMPUTING SERVICE SYSTEM

(75) Inventor: Takahiko Tsujisawa, Tokyo (JP)

(73) Assignee: NEC Corporation, Tokyo (JP)

( * ) Notice: Subject to any disclaimer, the term of this patent is extended or adjusted under 35 U.S.C. 154(b) by 745 days.

(21) Appl. No.: 10/033,292

(22) Filed: Oct. 25, 2001

(65) Prior Publication Data
US 2002/0055987 A1 May 9, 2002

(30) Foreign Application Priority Data
Nov. 1, 2000 (JP) .............................. 2000-334843

(51) Int. Cl.
*G06F 15/16* (2006.01)
*H04Q 7/20* (2006.01)

(52) U.S. Cl. ..................... 709/229; 709/227; 455/435.1

(58) Field of Classification Search ................ 709/201, 709/203, 219, 223, 224, 229, 227; 455/435.1
See application file for complete search history.

(56) References Cited

U.S. PATENT DOCUMENTS

| | | | |
|---|---|---|---|
| 5,845,282 A * | 12/1998 | Alley et al. ..................... 707/10 |
| 5,936,542 A * | 8/1999 | Kleinrock et al. .......... 340/5.61 |
| 5,960,085 A * | 9/1999 | de la Huerga ............. 340/5.61 |
| 6,138,150 A * | 10/2000 | Nichols et al. ............. 709/219 |
| 6,505,238 B1* | 1/2003 | Tran .......................... 709/208 |
| 6,553,375 B1* | 4/2003 | Huang et al. ................. 707/10 |
| 6,609,658 B1* | 8/2003 | Sehr ........................... 235/384 |
| 6,714,983 B1* | 3/2004 | Koenck et al. ............. 709/230 |
| 6,754,710 B1* | 6/2004 | McAlear ..................... 709/227 |
| 6,804,718 B1* | 10/2004 | Pang et al. ................. 709/226 |
| 6,879,996 B1* | 4/2005 | Laves ......................... 709/206 |
| 2003/0078988 A1* | 4/2003 | Freeny ....................... 709/217 |

FOREIGN PATENT DOCUMENTS

| | | |
|---|---|---|
| JP | 11-514137 | 6/1999 |
| JP | 11-313175 | 11/1999 |
| JP | 11-331181 | 11/1999 |
| JP | 2000-99459 | 4/2000 |
| JP | 2000-215172 | 8/2000 |
| JP | 2000-259537 | 9/2000 |

OTHER PUBLICATIONS

"Virtual Network Computing" by Richardson et al. IEEE Internet Computing vol. 2, No. 1, Jan./Feb. 1998.*
"User Interface Technologies For Home Appliances And Networks" by Corcoran et al.*

* cited by examiner

*Primary Examiner*—Ario Etienne
*Assistant Examiner*—Hussein Elchanti
(74) *Attorney, Agent, or Firm*—Scully, Scott, Murphy & Presser, P.C.

(57) ABSTRACT

From work computer 2, a user makes a reservation in server computer 4 to use work computer 3. The personal verification information and digital signature issued are stored in mobile media 5. This mobile media 5 is then carried and attached to work computer 3. After work computer 3 has completed verification of the user through the personal verification information and digital signature stored in mobile media 5, the same computer environment that was present when that user used work computer 2 is provided.

10 Claims, 4 Drawing Sheets

MOBILE COMPUTING SERVICE SYSTEM

BACKGROUND OF THE INVENTION

1. Field of the Invention

This invention relates to a mobile computing service system that realizes the same kind of computer environment for a user when that user moves around in a system of multiple computers connected by a data transmission network, through a mobile media which can be removed from a computer and carried and subsequently attached to another destination computer registered in a server.

2. Description of Related Art

Computer transmission utilizing data transmission networks like the Internet has expanded rapidly in recent times in line with markedly improved performance of personal computers and improved transmission network technology. Services supplying a variety of information for cost to personal computers connected to such networks have proliferated. Utilization of such services for acquisition of information required for business is becoming a means indispensable for carrying on business and it is essential to use personal computers connected to a network even when the user moves to another place like an office workplace they are visiting or a worksite. Because a personal computer is an information terminal of an individual in most cases each individual sets their front end processor to suit their own desires and personal computers with the screen configurations set freely by each individual are used as a dedicated terminal of each individual. Things like presentation materials for example created with a personal computer can be processed in the same way as originally processed by using a personal computer loaded with the same applications. Therefore the data of such materials are copied on to a removable media and moved to a destination computer where processing is performed.

As mentioned above however, the operating environment of a personal computer is usually set to conform to the desires of the particular individual who uses it. This causes a problem because when data is copied to a removable media and transferred to a destination computer to perform work it becomes necessary to perform that work in an operating environment different to the original one, reducing operability and resulting in decreased work productivity. Further, there is a problem due to the necessity of carrying a personal computer unit like a laptop computer for example so that the original work environment can be maintained.

SUMMARY OF THE INVENTION

In light of the above an object of the present invention is to provide a mobile computing service system that realizes the same computing environment in a location different to the location of the original computing environment through a mobile media carried by a user, which houses programs that are set for a computer environment of that individual user, which mobile media can be attached to a computer registered in a server. A further objective of the present invention is to provide a mobile computing service system in which it is possible to look up the locations of a computer registered in a server and the times that computer is available for use and make a reservation to use that computer.

The present invention provides a solution to the above problems through a mobile computing service system which is a system comprised of: a server computer providing prescribed services, a data transmission network and a first work computer for receiving provision of prescribed services from the server computer via the network as well as one or multiple second work computers connected to the server computer via the network;

wherein the first work computer provides an attachable mobile media for housing encrypted personal verification information and the programs required for operating that work computer, provides a transmission means for connecting to the server computer via the network and provides a central processing part for accessing the server computer through the transmission means and performing forwarding and reception processes;

wherein the server computer at least provides a registration part for registering personal verification information uploaded from the first work computer via the data transmission network;

wherein the second work computer provides a transmission means for connecting to the server computer via the data transmission network, provides a registering part for registering personal verification information uploaded from the server computer and provides a central processing part for reading out necessary programs from the mobile media, accessing the server computer through the transmission means and performing forwarding and reception processes when the mobile media is attached;

wherein personal verification information is sent from the first work computer via the server computer to the second work computer;

wherein the second work computer stores personal verification information received, and when the mobile media detached from the first work computer is attached, collates personal verification information stored in the mobile media and performs verification processes, reads out programs stored in the mobile media based on verification results, and is set to provide the same environment in that second work computer as existed in the first work computer.

Within this mobile computing service system, the server computer provides a database for storage of registered information comprised of the locations in which the one or multiple second work computers that are registered are placed and the times they are available for use, and should forward personal verification information on a user with a reservation and information on the reservation to the appropriate second work computer when the information registered in the database is referenced through the first work computer and the second work computer is reserved.

The server computer accepts reservations for the use of a second work computer only in respect of registered members who have paid membership fees in advance and should forward the personal verification information and reservation information to the appropriate second work computer.

The first work computer, second work computer and server computer have a means for encryption/decryption of the same format and should encrypt personal verification information and reservation information forwarded, and decrypt information received.

It is suitable for the first work computer and/or a second work computer fitted with the mobile media to boot from the mobile media.

The mobile media may provide a magnetic disk part and a controller for controlling the processes for writing in and reading out data of the magnetic disk part.

The second work computer provides an input means for inputting personal verification information and should perform verification processes based on personal verification information stored in the mobile media as well as verification of a user through verification processes based on personal verification information input through the input means.

The second work computer comprises two elementary work computers connected by a data transmission network, one of which computers should be connected to the server computer via the data transmission network and control forwarding processes of data between the other elementary work computer and the server computer.

The second work computer deletes the personal verification information from a storage part at the point at which the work processes of the appropriate second work computer finish and delivers information about usage like the usage commencement and completion times to the server computer, while the server computer should calculate the usage based on the information about usage thus received.

The server computer posts notice concerning things like the location of a second work computer and is capable of processing collection of notice fees from a service company providing the second work computer.

BRIEF DESCRIPTION OF THE DRAWINGS

Specific embodiments of the present invention will now be described, by way of example only, with reference to the accompanying of drawings in which.

DETAILED DESCRIPTION OF THE PREFERRED EMBODIMENTS

First Embodiment

Figure 1:
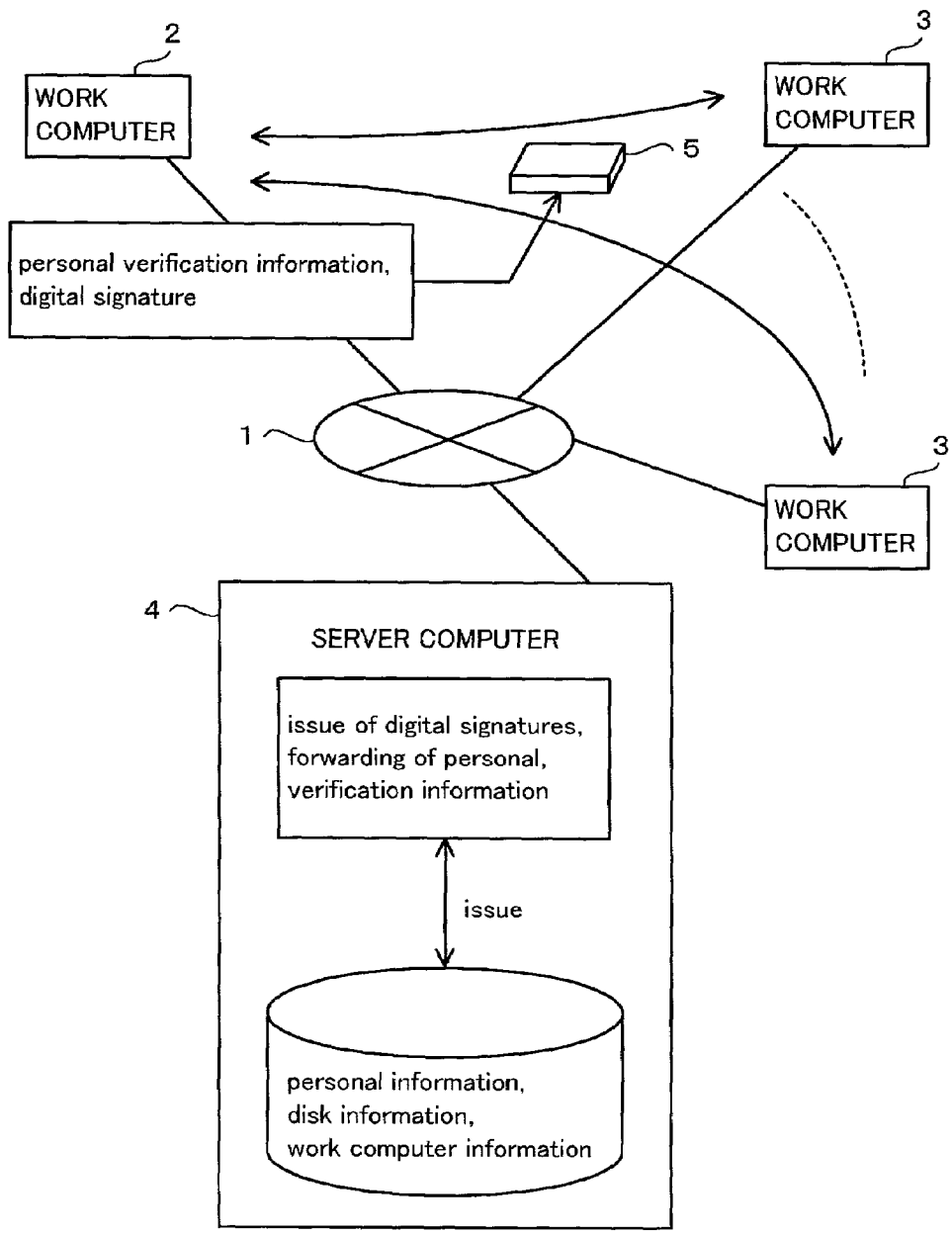
FIG. 1 is a conceptual drawing showing a mobile computing service system according to a first embodiment of the present invention.

A first embodiment of the present invention will now be described with reference to the drawings. FIG. 1 is a conceptual drawing showing a mobile computing service system according to the first embodiment of the present invention. Reference numeral 2 in that drawing indicates a work computer for receiving provision of desired services via a data transmission network 1 with an attached mobile device 5 housing personal verification information and programs necessary for running a work computer. Reference numeral 3 indicates a work computer set up by a service company which provides services for a work computer which, when a mobile media 5 is attached, is booted up from that mobile media 5. There are no restrictions on the number of work computers 3 that may be included and the service company itself can decide the number as they choose. Reference numeral 4 indicates a service computer for housing service information provided by a company which performs mobile computing services, personal verification information of registered users and work computer information, which runs a home page and via a data transmission network, issues digital signatures for work computers 2 and 3, forwards personal verification information and provides service information.

Work computers 2 and 3 and server computer 4 are equipped for the same kind of encryption/decryption format and perform encryption and transmission of personal verification information and reservation information of a work computer. A public transmission network like the Internet for example is used for data transmission network 1. Mobile media 5 is able to be attached to work computer 2, and when a user moves that user can carry mobile media 5 to the destination work computer 3 where mobile media 5 is used as it is attached thereto. Work computers 2 and 3 are set to enable them to be booted up from an attached mobile media 5.

Figure 4:
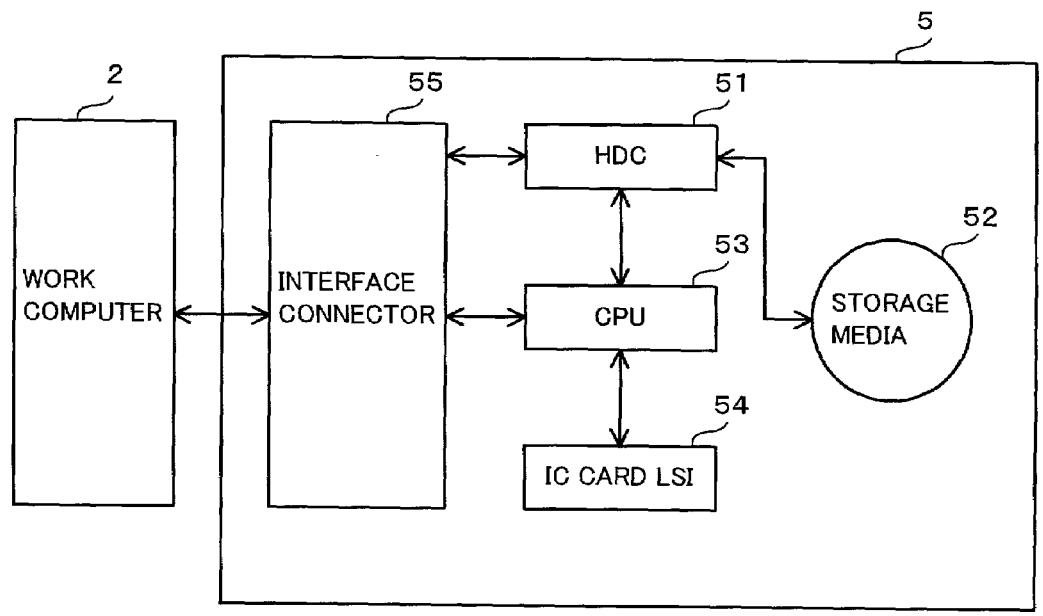
FIG. 4 is a block diagram showing a configuration of mobile media.

FIG. 4 is a block diagram showing the configuration of mobile media 5. The storage media 52 shown in that drawing is a storage medium like a magnetic disk for example, housing things like a computing environment like an OS, front-end processor, application programs and data files. IC card LSI (Large-scale Integration) 54 houses personal verification information and digital signature information. HDC (Hard Disk Controller) 51 is connected to work computer 2 and/or 3 via interface connector 55 and performs processes for forwarding of data of storage media 52 and work computer 2 and/or 3. For HDC 51 an HDC like an IDE (Integrated Device Electronics) interface compatible HDC can be used. CPU (Central Processing Unit) 53 controls information exchange of work computer 2 and/or 3 and the data processing of mobile media 5.

Figure 5:
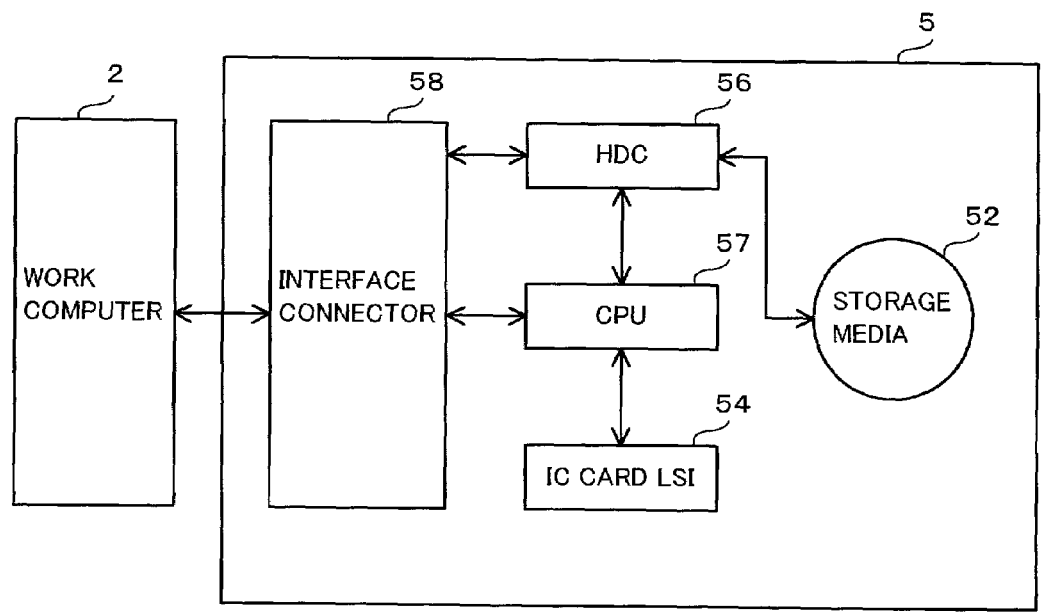
FIG. 5 is a block diagram showing a configuration of mobile media.

FIG. 5 is a block diagram showing another configuration of mobile media 5. HDC 56 shown in that drawing is a controller integrating the functions for information exchange between the IDC interface and IC card LSI 54 and work computers 2 and/or 3. CPU 57 controls information exchange via HDC 56 between IC card LSI 54 and work computer 2 and/or 3 and the data processing of mobile media 5.

The workings of a mobile computing service system will now be described in detail with reference to FIG. 1. Firstly, a user of work computer 2 accesses, via data transmission network 1, server computer 4 run by a mobile computing service company and forms a contract wherein information specifying the user like fingerprint information or a password that constitutes personal verification information is supplied to server computer 4 and the user is registered as a member. Personal verification information and a digital signature is then issued for the registered user from server computer 4. Work computer 2 stores the thus received personal verification information and digital signature received in mobile media 5. The mobile computing service company forms a contract with the service company providing work computer 3, registers work computer 3 and constructs a database stored in server computer 4, concerning things like the times and places at which work computer 3 is available for use.

Next, for using work computer 3, the user of work computer 2 logs into server computer 4 via data transmission network 1 and displays a home page of the mobile computing service company. Following the instructions of the homepage thus displayed, the user of work computer 2 accesses a database and looks for the times at which a work computer 3 located at a desired location is available for use. After confirming a work computer 3 is available for use at a desired time the user of work computer 2 reserves a time to use that work computer 3. Based on this reservation for use, server computer 4 encrypts the reservation information and sends it to work computer 2. Work computer 2 stores the reservation information thus received in mobile media 5.

Next, server computer 4 sends to the reserved work computer 3 via data transmission network 1, personal verification information for the user reserving the work computer 3 and the reservation information as well as an encrypted key for deciphering reservation information.

For using work computer 3, the user with the reservation carries the mobile media 5 containing the reservation information and attaches that mobile media 5 to work computer 3 at the appropriate work computer 3 location. Work computer 3 reads out the data stored in mobile media 5 and collates the personal verification information and digital signature therein. Work computer 3 deciphers the reservation information and confirms that the user to use that work computer 3 is a registered member and that there is a reservation for usage. Next, work computer 3 is reset and booted up from mobile media 5 and the same computing environment that existed when the same user used work computer 2 is provided. After the user has completed their work computer 3 deletes the stored personal verification information for that user from the storage part, encrypts information about the usage like when the user started and finished using work computer 3 and the usage time and sends that information to server computer 4. Server computer 4 calculates the usage charges based on this usage information. The mobile computing service company collects usage fees from the user based on the usage fees as calculated for the prescribed period.

Second Embodiment

Figure 2:
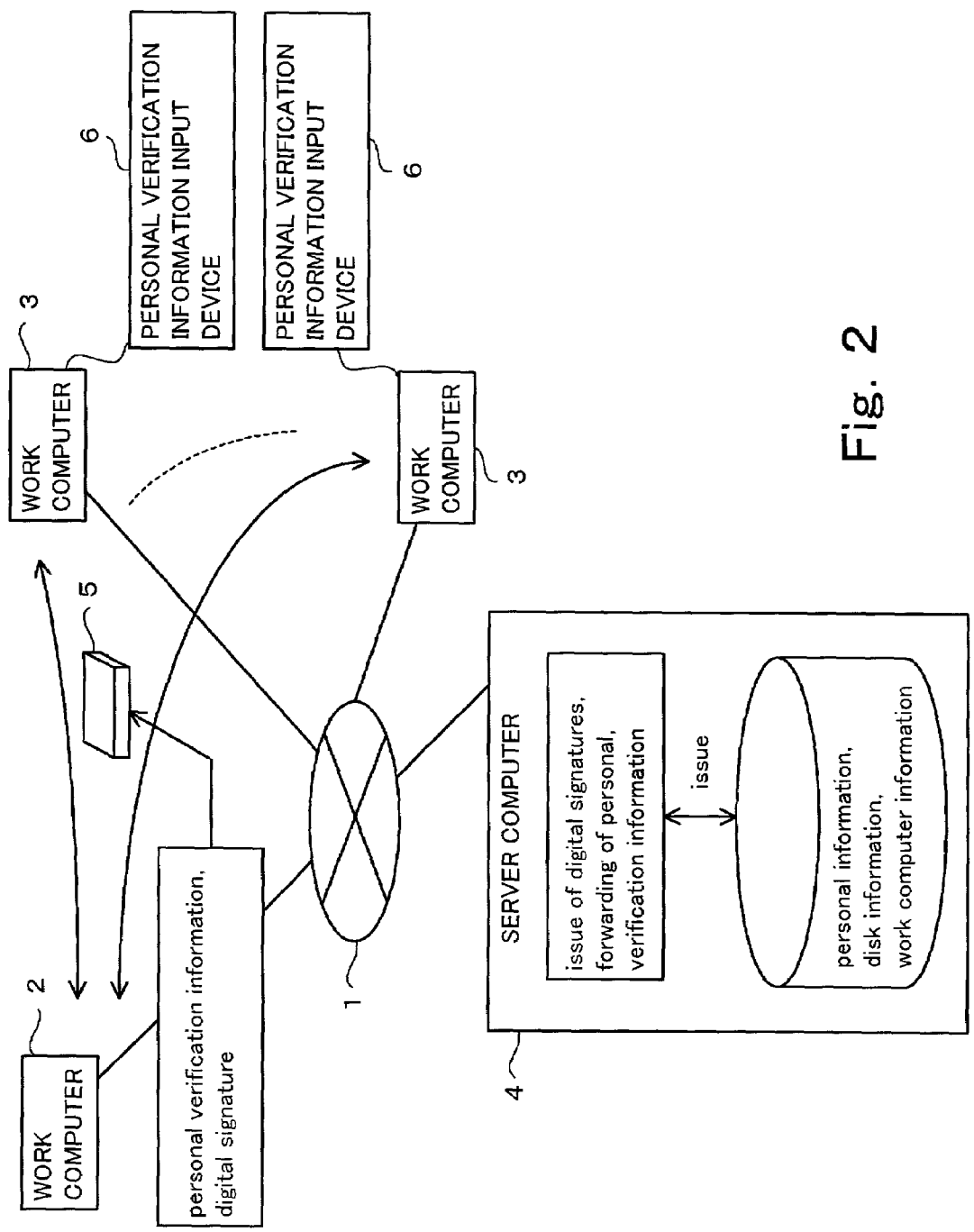
FIG. 2 is a conceptual drawing showing a mobile computing service system according to a second embodiment of the present invention.

A second embodiment of the present invention will now be described with reference to the drawings. FIG. 2 is a conceptual drawing showing a mobile computing service system according to the second embodiment of the present invention. The following explanation will be abbreviated inasmuch as for those parts of FIG. 2 that are the same as FIG. 1 the same marks apply. Firstly, a user to use work computer 3 reserves time to use work computer 3 in accordance with the same procedures as described above. Reservation information received from server computer 4 is stored in mobile media 5. Next, to use work computer 3, the user with the reservation carries mobile media 5 containing the reservation information and attaches that mobile media 5 to work computer 3 at the appropriate location of work computer 3.

Work computer 3 reads out the data stored in mobile media 5 and collates the personal verification information and digital signature therein. Work computer 3 deciphers the reservation information and performs the first verification, ascertaining whether the user to use that work computer 3 is a registered member and whether a reservation for usage has been made. When the registration of the member and the reservation for usage have been confirmed work computer 3 requests input of specifying information through a personal verification information input device 6. Work computer 3 compares the information input from personal verification information input device 6 with stored personal verification information and performs a second verification, ascertaining whether or not the user is a registered member. After confirming that user as being a registered member, work computer 3 is reset and booted up from mobile media 5 and the same kind of computing environment is provided as when that user uses work computer 2. Thereafter, the usage time is calculated in the same manner as previously described and usage charges are collected as appropriate.

Third Embodiment

Figure 3:
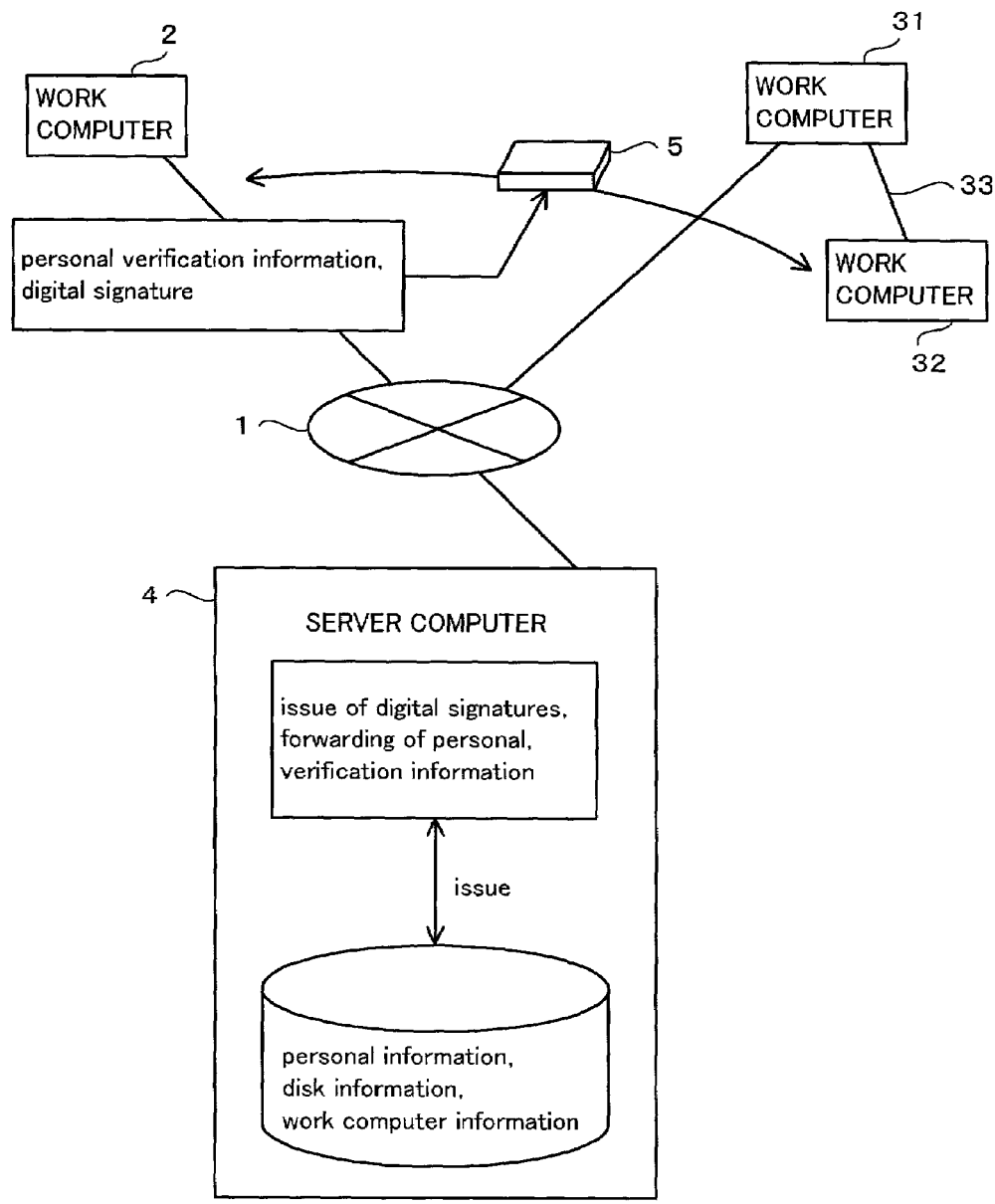
FIG. 3 is a conceptual drawing of a mobile computing service system according to a third embodiment of the present invention.

A third embodiment of the present invention will now be described with reference to the drawings. FIG. 3 is a conceptual drawing showing a mobile computing service system according to the third embodiment of the present invention. As shown in that drawing work computers set up by a work computer service company comprise work computer 31 connected to server computer 4 via data transmission network 1 and work computer 32 connected to work computer 31 by data transmission line 33. Where work computer 32 is for example a computer located in an aircraft, work computer 31 would be equivalent to a database of the airline company and would operate in linkage with the air ticket reservation system. Work computer 32 would log into server computer 4 via work computer 31.

Firstly, a user to use work computer 32 stores personal verification information and reservation information supplied from server computer 4 in mobile media 5 through the operations as described above. Server computer 4 also forwards that personal verification information and reservation information to work computer 32 via work computer 31 Next, when work computer 32 will be used, the user carries the mobile media 5 containing the reservation information and attaches that mobile media 5 to work computer 32 at the location of work computer 32. After work computer 32 completes the user verification processes as described above, that computer is reset and booted up from mobile media 5 and the same computing environment that existed when the same user used work computer 2 is provided.

Advertising for the service company can be posted through server computer 4. Such advertising could include for example locations where work computer 3 are situated or if the service company is an Internet cafe, the price and varieties of coffee available at the cafe. It would be possible for a mobile computing service company to reduce membership charges by collecting charges for service company advertisements in this way.

As described, the present invention provides a system that enables realization of the same computing environment even in a different work location, through a mobile media carried by a user housing programs that are set for a computer environment of that individual user which media can be attached to a destination computer registered in a server which computer is located in a different place thereby preventing deterioration in operability that results from a changed computing environment and thus raising work efficiency. Further, because it is possible with the present invention to look up the locations of computers registered in a server and the times those computers are available for use and make a reservation to use a computer a user can simply carry the mobile media, thereby obviating the necessity of carrying a computer device like a laptop computer.

What is claimed is:

1. A mobile computing service system which is a system comprised of:

a server computer providing prescribed services, a data transmission network and a first work computer for receiving provision of prescribed services from said server computer via said network and one or multiple second work computers connected to said server computer via said network;

wherein said first work computer provides an attachable mobile media for housing encrypted personal verification information and programs required for operating an appropriate work computer, provides a transmission means for connecting to said server computer via said network and provides a central processing part for accessing said server computer through said transmission means and performing forwarding and reception processes;

wherein said server computer provides at least a registration part for registering personal verification information uploaded from said first work computer via said data transmission network;

wherein said second work computer provides a transmission means for connecting to said server computer via said data transmission network, provides a registering part for registering personal verification information uploaded from said server computer and provides a central processing part for reading out necessary programs from said mobile media, accessing said server computer through said transmission means and performing forwarding and reception processes when said mobile media is attached;

wherein personal verification information is sent from said first work computer via said server computer to said second work computer;

wherein said second work computer stores personal verification information received, and when the mobile media detached from the first work computer is attached, collates personal verification information stored in said mobile media and performs verification processes, reads out programs stored in said mobile media based on verification results, and is set to provide the same computing environment including configurations, operating settings and formats, in the second work computer as existed in the first work computer.

2. A mobile computing service system according to claim 1 wherein said server computer provides a database for storage of registered information comprised of the locations in which said one or multiple second work computers that are registered are placed and the times said one or multiple second computers are available for use, and forwards personal verification information of a user with a reservation and information on the reservation to the appropriate second work computer as the information registered in the database is referenced through the first work computer and the second work computer is reserved.

3. A mobile computing service system according to claim 1 wherein said server computer accepts reservations for the use of said second work computer only in respect of registered members who have paid membership fees in advance and forwards said personal verification information and reservation information to the appropriate second work computer.

4. A mobile computing service system according to claim 1 wherein said first work computer said second work computer and said server computer have a means for encryption/decryption of the same format, encrypt personal verification information and reservation information forwarded, and decrypt information received.

5. A mobile computing service system according to claim 1 wherein said first work computer and/or said second work computer fitted with said mobile media, boot from said mobile media.

6. A mobile computing service system according to claim 1 wherein said mobile media provides a magnetic disk part and a controller for controlling the processes for writing in and reading out data of said magnetic disk part.

7. A mobile computing service system according to claim 1 wherein said second work computer provides an input means for inputting personal verification information and performs verification processes based on personal verification information stored in said mobile media and processes for the verification of a user through verification processes based on personal verification information input through said input means.

8. A mobile computing service system according to claim 1 wherein said second work computer comprises two work computers connected by a data transmission network, one of which computers should be connected to said server computer via said data transmission network and control forwarding processes of data between the other work computer and said server computer.

9. A mobile computing service system according to claim 1 wherein said second work computer deletes said personal verification information from a storage part at the point at which the work processes of the appropriate second work computer finish and delivers information about usage like the usage commencement and completion times to said server computer and wherein said server computer calculates the usage based on the information about usage thus received.

10. A mobile computing service system according to claim 1 wherein said server computer posts notice concerning things like the location of said second computer and processes collection of notice fees from a service company providing said second work computer.

* * * * *